United States Patent [19]
Dammann

[11] Patent Number: 5,159,900
[45] Date of Patent: Nov. 3, 1992

[54] METHOD AND MEANS OF GENERATING GAS FROM WATER FOR USE AS A FUEL

[76] Inventor: Wilbur A. Dammann, 1115 Carriage Rd., Papillion, Nebr. 68046

[21] Appl. No.: 697,413

[22] Filed: May 9, 1991

[51] Int. Cl.$^5$ .............................. F02B 43/08
[52] U.S. Cl. ........................ 123/3; 204/129; 204/225; 204/278; 204/294
[58] Field of Search .............. 123/3, DIG. 12; 204/101, 129, 225, 242, 278, 294, 170

[56] References Cited

U.S. PATENT DOCUMENTS

| | | | |
|---|---|---|---|
| Re. 28,547 | 9/1975 | Pacheco | 123/3 |
| 887,989 | 5/1908 | Weber | 123/3 |
| 1,327,495 | 1/1920 | Smith | 123/3 |
| 1,529,764 | 3/1925 | Bamber | 123/3 |
| 1,716,084 | 6/1929 | Percy | 180/69.5 |
| 1,795,670 | 3/1931 | Odell et al. | 123/3 |
| 4,141,694 | 2/1979 | Camacho | 48/61 |
| 4,181,504 | 1/1980 | Camacho | 48/197 |
| 4,279,710 | 7/1981 | Coughlin | 204/129 |
| 4,333,423 | 6/1982 | Firey | 123/23 |
| 4,361,474 | 11/1982 | Shoaf et al. | 123/3 |
| 4,472,172 | 9/1984 | Sheer et al. | 48/202 |
| 4,487,683 | 12/1984 | Bozzuto | 208/8 |
| 4,566,961 | 1/1986 | Diaz et al. | 204/168 |
| 4,588,850 | 5/1986 | Mueller et al. | 585/539 |
| 4,690,743 | 9/1987 | Ethington et al. | 204/168 |

FOREIGN PATENT DOCUMENTS 765517 9/1980 U.S.S.R.
1467234 3/1989 U.S.S.R.

OTHER PUBLICATIONS

Okada et al., "On the Electrolysis of Coal Slurries", Journal of the Electrochemical Soc., vol. 128, No. 10, Oct. 1981, pp. 2097-2102.

Coughlin et al., "Hydrogen Production from Coal, Water and Eelectrons" Nature vol. 279, May 1979, pp. 301-303.

*Primary Examiner*—Noah P. Kamen
*Attorney, Agent, or Firm*—Zarley, McKee, Thomte, Voorhees & Sease

[57] ABSTRACT

A method and means of generating gas from water for use as a fuel wherein a pair of spaced-apart carbon electrodes are positioned in a reaction chamber having water therein. Electrical current is supplied to the carbon electrodes to create an electrical arc therebetween causing the electrodes to burn and oxidize to form carbon monoxide and hydrogen. The gas is generated on an on-demand basis.

4 Claims, 2 Drawing Sheets

METHOD AND MEANS OF GENERATING GAS FROM WATER FOR USE AS A FUEL

BACKGROUND OF THE INVENTION

This invention relates to a method and means for the generation of gas for use as a fuel for internal combustion engines. More specifically, this invention relates to a method for rapidly generating fuel gas from water ad carbon.

It is the applicant's belief that a mixture of carbon monoxide and hydrogen ($COH_2$) is a gas which will burn very clean in oxygen or air, and that the gas maybe used as a fuel for an internal combustion engine. When burned, $COH_2$ produces carbon dioxide and water vapor, thereby adding very little, if any, pollution to the environment.

If $COH_2$ gas is produced for use as a fuel for an internal combustion engine, a problem arises in the storage of the same which maybe a fuel hazard. In order to eliminate the storage problem, it is desirable to produce the as on an on-demand basis.

It is therefore a principal object of the invention to provide a method and means for the on-demand generation of gas from water and carbon for use as a fuel for internal combustion engines.

A further object of the invention is to provide a method and means for forming $COH_2$ gas.

Yet another object of the invention is to provide a method and means for the on-demand gas generation from water by oxidizing carbon in water, hereby producing $COH_2$ gas.

Still another object of the invention is to provide a process for the on-demand generation of gas from water for use as a fuel for internal combustion engines which is safe to use and which eliminates storage problems associated with such a process.

These and other objects of the invention will be apparent to those skilled in the art.

SUMMARY OF THE INVENTION

The apparatus and method of the present invention serves to convert carbon and water into a fuel gas ($COH_2$) on-demand as required to sustain the operation of an internal combustion engine. The gas is released rapidly and the amount of the same is controlled by the electrical energy input into the carbon electrodes. The dangerous gas storage problem is eliminated because the gas is produced on-demand. Only a sufficient amount of gas to operate the internal combustion engine is produced at any time. Anti-pollution devices are not required as the gas burns pure and clean.

DESCRIPTION OF THE PREFERRED EMBODIMENT

Figure 2:
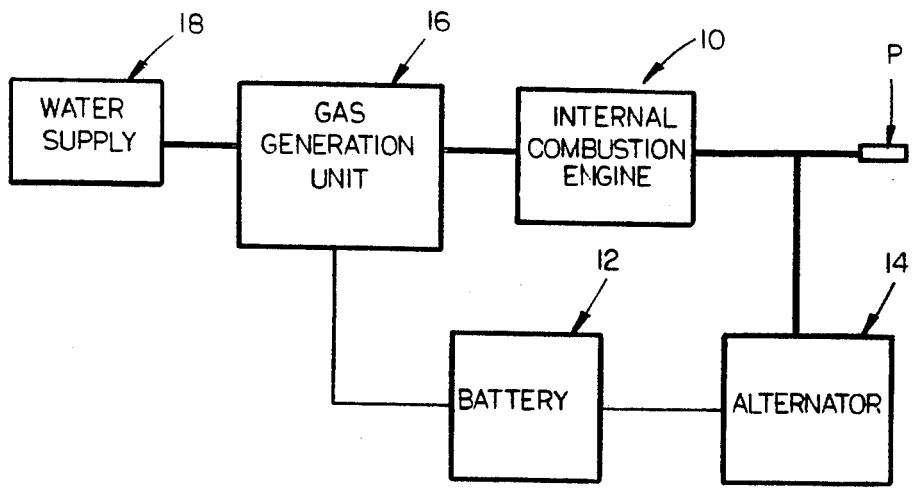
FIG. 2 is a diagram illustrating the gas generation unit of this invention interfaced with an internal combustion engine.
Figure 3:
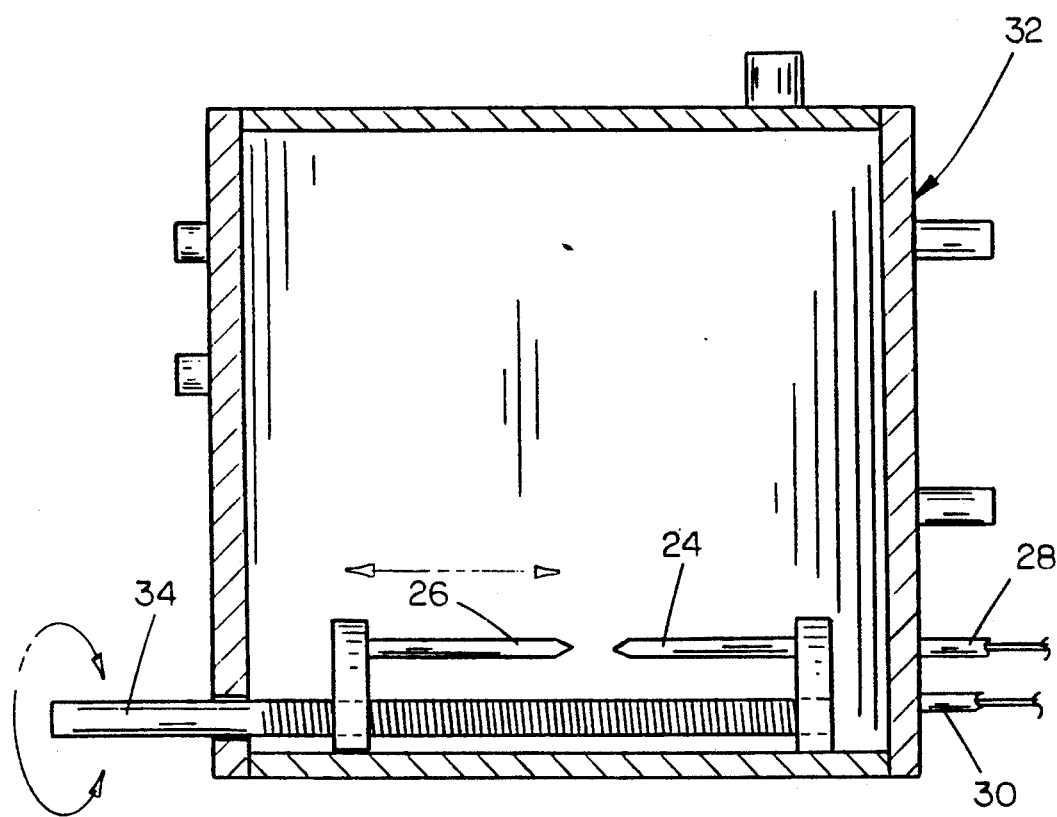
FIG. 3 is a sectional view of the gas reaction chamber illustrating the carbon rods positioned therein.

In FIG. 2, the numeral 10 refers to a conventional internal combustion engine capable of burning $COH_2$. Engine 10 may supply power to a vehicle, an electrical generator or a heat pump or the like, referred to generally by the reference letter P. For the purpose of this disclosure, the engine 10 will be described as being a component of a vehicle including a battery 12 and an alternator 14. In order to provide $COH_2$ gas for the engine, a gas generation unit 16 is provided which is in communication with a water supply or source 18.

Figure 1:
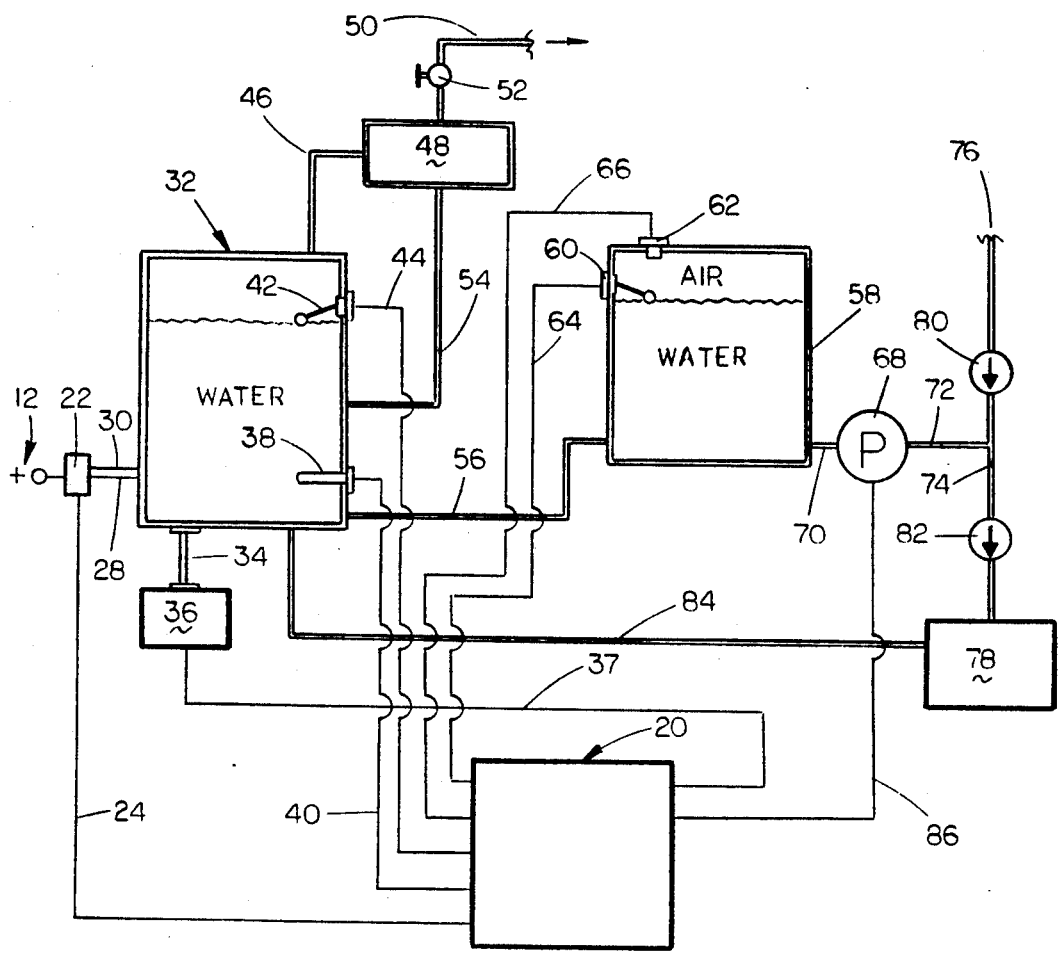
FIG. 1 is a schematic diagram of the gas generation unit of this invention.

In FIG. 1, the numeral 20 refers to a conventional computer or microprocessor which is electrically connected to a power sensor 22 by line 24. Power sensor 22 is operatively connected to a source of electrical power such as the battery 12 by any convenient means. Power sensor 22 senses the voltage across the electrodes 24 and 26 and senses the current flowing therethrough. This information is fed to the microprocessor 20 which in turn controls the operation of the servo drive 36 as will be described in more detail hereinafter. Electrode 24 is fixed in position within the reaction chamber 32 while electrode 26 is mounted on a servo shaft 34 which is controlled by the servo drive 36 to vary the distance between the electrodes 24 and 26. Servo drive 26 is controlled by microprocessor 20 through lead 37.

Reaction chamber 32 includes a temperature sensor 38 which is connected to microprocessor 20 by lead 40. Water level sensor 42 is also provided in reaction chamber 32 for sensing the level of water in chamber 32 and which is connected to microprocessor 20 by lead 44.

Gas line 46 is in communication with the upper interior of chamber 32 ad extends to a gas/water separator 48 having gas line 50 extending from the upper end which includes a pressure regulator 52. Line 52 extends to the internal combustion engine for combustion therein. Water return line 54 extends from the bottom of separator 458 to chamber 32 to return water thereto after separation of the water and gas in separator 48.

Water line 56 extends from the lower end of chamber 32 to expansion chamber 58 to permit water to flow between chamber 32 and chamber 58 as the water within chamber 32 expands due to pressure within chamber 32 when the gas is produced therein.

Water level sensor 60 and air pressure sensor 62 are provided in chamber 58 (FIG. 1) and are connected to microprocessor 20 by leads 64 and 66 respectively. Pump 68 is connected to chamber 58 by water line 70 and has water line 72 extending therefrom to water line 74. Water line 74 is connected to a source of water referred to generally by the reference numeral 76. Line 74 is fluidly connected to water cooler 78 and has check valves 80 and 82 imposed therein in the locations seen in FIG. 1. Water cooler 78 is connected to the lower end of chamber 32 by water line 84. Pump 68 is controlled by microprocessor 20 through lead 86.

In operation, the process starts when power is supplied to the electrodes 24 and 26. The microprocessor 20 checks all sensor inputs such as the temperature sensor 38, water level sensor 44, water level sensor 60, pressure sensor 62, etc. If the pressure within expansion chamber 58 is within its specified range, the reactor will not be activated. Further, if the water level and temperatures are within the preferred operating range, the pump 68 will not be activated. Microprocessor 20 continuously checks the signals from the sensors and initiates a response when any signal indicates need.

If the pressure is below the specified range as sensed by the sensor 62, microprocessor 20 initiates the servo drive 36 to move carbon electrode 26 toward or away from carbon electrode 24 to achieve the optimum for the most efficient operation monitoring the feedback from the reactor power sensor 22. This operation continues until the signal from the pressure sensor 62 indicates that the pressure is within the operating range.

The signals from the water level sensors 42 and 60 and the temperature sensor 38 is monitored continuously. The pump 68 functions to add water to the system or circulate water through the cooler 78. The direction of the pump operation determines the function. Water level takes precedence over temperature.

If the water levels falls below the required point, as indicated by the combined logic of the two level sensors 42 and 60, pump 68 is operated in the reverse mode and moves water from the external water supply through the directional check vale 80 to the expansion chamber 58. This operation ceases when the level sensor 60 signals indicate proper value.

If the temperature sensor 38 indicates high water temperature, microprocessor 20 controls the pump to run in a forward direction, thereby circulating water through the check valve 82 and the water cooler 78 back to the reaction chamber 32. This operation continues until the temperature sensor signal is within normal operating range or low water level is sense. The water replenishing and cooling functions operate simultaneously with reactor operation. If the ignition of the vehicle is turned off while the reaction is operating, the microprocessor controls the servo drive to back off the electrodes before shutting down the system.

The gas generation unit of this invention provides constant pressure gas at a specified volume. Instantaneous demand determines the rate of operation. The gas production is on a fully off-on basis, and is intermittent during periods of low and moderate fuel consumption. A buffer volume is maintained at a level to provide the instantaneous requirement. The pressure and volume of the gas reserve is reactively small and does not pose a safety hazard. The process operates only when the vehicle ignition is on.

The reaction is controlled by the microprocessor 20 to provide optimum output with minimum electrical energy input. Battery 12 provides electrical power for the microprocessor and the reactor. Intermittent substantial power is require only when the reactor is operating. When the engine is operating, the battery is continuously being charged by the alternator 14.

The microprocessor 20 causes electrical energy to be supplied to the carbon electrodes 24 and 26 and when the electrodes are in the proper position, an electrical are passes there between with the temperature of the electrical arc perhaps exceeding 6000° F. The heat and difference of potential between the carbon electrodes ionizes the carbon of the carbon electrodes. The conduction current burns the carbon to produce a flame. Oxidation (burning with a flame) of the carbon combines carbon and oxygen forming carbon monoxide. When this process is performed under water, it withdraws oxygen from the water, thereby liberating the hydrogen therefrom. The result is the rapid release of hydrogen and carbon monoxide gas. This process releases the gas from the water on-demand as previously stated. The amount of gas being produced is directly proportional to the flame and the electrical energy producing it. The carbon monoxide when mixed with hydrogen forms $COH_2$ gas which burns very clean in oxygen or air. When burned, $COH_2$ provides carbon dioxide and water vapor thereby substantially reducing pollution to the environment.

The carbon rod electrodes utilized in the above-identified method will be consumed during the oxidation process. Thus, it will be necessary to replace the carbon electrodes as they become consumed. An alternate concept is to use high temperature no-oxidizing electrodes rather than the carbon rod electrodes and to provide a carbon rich feedstock solution utilized in the reaction. For example, such a carbon rich feedstock solution could be $C_6H_{12}O_6$ or $C_{12}H_{22}O_{11}$. The only problem with utilizing such a feedstock solution is that the carbon in this form is not electrically conductive. The feedstock oxygen-carbon molecular composition is balanced, as in $C_6H_{12}O_6$ or $C_{12}H_{22}O_{11}+H^2O$ and conductive carbon is added to the reaction chamber, as in $C+C_6H_{12}O_6$ or $C+C_{12}H_{22}O_{11}+H^2O$, the reactive carbon will be replenished from the feedstock as the hydrogen is displaced in the rapid oxidation process. If so, carbon will remain in the reaction chamber to provide an electrical current path, with only the requirement being that feedstock solution be added to the chamber as it is consumed in the process.

Thus it can be seen that the invention accomplishes at least all of its stated objectives.

I claim:

1. A gas generation unit for providing gas for an internal combustion engine, comprising:
   a reaction chamber having water therein,
   a pair of spaced apart carbon electrodes in said reaction chamber immersed in the water therein,
   means for supplying electrical current to said carbon electrodes to create an electrical arc therebetween whereby the carbon electrodes will burn and rapidly oxidize to from carbon monoxide and hydrogen.

2. The gas generation unit of claim 1 wherein means are provided for varying the distance between said carbon electrodes.

3. The gas generation unit of claim 2 wherein a computer means controls said means for varying the distance between said carbon electrodes.

4. A gas generator unit for providing gas for an internal combustion engine, comprising,
   a reaction chamber having a feedstock solution therein,
   a pair of spaced-apart carbon electrodes in said reaction chamber immersed in the feedstock solution therein,
   said feedstock solution being comprised of a mixture of water and electrical conductive carbon,
   and means for supplying electrical current to said electrodes to create an electrical arc therebetween whereby the carbon electrodes will burn and rapidly oxidize and whereby the carbon in said feedstock solution will burn and rapidly oxidize to form carbon monoxide and hydrogen.

* * * * *

UNITED STATES PATENT AND TRADEMARK OFFICE
CERTIFICATE OF CORRECTION

PATENT NO. : 5,159,900
DATED : November 3, 1992
INVENTOR(S) : Abe et al

It is certified that error appears in the above-indentified patent and that said Letters Patent is hereby corrected as shown below:

On the title page, add item [73] Assignee: "NIPPONDENSO CO., LTD. KARIYA-SHI, JAPAN"

Signed and Sealed this

Twenty-third Day of November, 1993

Attest:

BRUCE LEHMAN

Attesting Officer     Commissioner of Patents and Trademarks